Patented Dec. 7, 1926.

1,609,506

UNITED STATES PATENT OFFICE.

FRANK P. BROCK, OF EVANSTON, ILLINOIS, ASSIGNOR TO BAKELITE CORPORATION, OF NEW YORK, N. Y., A CORPORATION OF DELAWARE.

METHOD OF PLASTICIZING PHENOLIC MOLDING MATERIALS.

No Drawing.    Application filed November 2, 1923. Serial No. 672,427.

This invention is a method for improving the plasticity of phenolic resin molding compounds of the potentially reactive type, and is applicable whether the deficiency in plasticity has arisen out of or in connection with the manufacturing procedure, or whether it has developed, as sometimes occurs, in molding mixtures which were initially of satisfactory quality. It is known to those familiar with this art that phenolic resin compositions have a tendency to become "dry", or to lose plasticity, to the extent that they are no longer suitable for pre-molding the so-called "bisquits" for use in hot-press molding of complicated or intricate designs, or for the direct hot-press molding of such designs. Phenolic resin compositions, whether in powder or granular form, or in the form of sheets of paper coated or impregnated with the resin, often reach such condition that they can be employed only for molding the very simplest articles, or at times must be discarded as useless or mixed with fresh materials of higher plasticity. From the foregoing the desirability of a plasticizing agent which can be merely mixed with the powdered or granular material, or sprayed on or otherwise applied to the paper, and which when so applied will improve the molding quality, without affecting adversely the quality of the molded product, will be obvious.

I have discovered that furfuraldehyde (furfural) when added in suitably restricted proportions to potentially re-active molding materials exhibiting the above described deficiency in plasticity, and properly incorporated therewith without substantial chemical reaction, has the desired effect of improving or restoring the molding quality. The quantity so used will depend upon the original condition of the material to be treated, but is relatively small, seldom exceeding 15% by weight of the molding material, and being often only 1–5%. The exact amount is readily determined by simple test. I now attribute this result to the remarkable and indeed unique mutual solvent relation existing between furfural and the phenolic resins of the potentially reactive type. By phenolic resins of the potentially reactive type I mean such resins as contain sufficient methylene-containing hardening agent to determine their transformation to the infusible state upon application of sufficient heat.

Any desired method may be used for incorporating the furfural with the phenol resin composition. In the case of molding powders or granulated materials it is sufficient to agitate these in a suitable apparatus of the type of a flour blender, in presence of a spray of atomized furfural: or the plasticizer may be introduced in a kneading machine, or under mixing rolls, the furfural being sprayed upon the material until the desired degree of plasticity is attained. In the case of coated or impregnated papers, the resin may be plasticized by simple spraying, dipping or like methods. After this treatment of defective sheets it will be found that they are in all respects suitable for the manufacture of laminated stock by superposing and hot-pressure molding.

An especially valuable application of the present method is as follows:

Paper sheets, coated or impregnated with the phenolic resin, and more especially waste sheets or portions of sheets, are shredded in a cutter mill and then ground to powder in a ball mill or equivalent apparatus. Sheets containing resin of low plasticity are particularly well adapted for this powdering operation. The ground material is then charged into a mixer and plasticized by furfural as described above.

I claim:

1. The method of hot-molding phenol resin compositions of the potentially reactive type which are deficient in plasticity, comprising incorporating furfuraldehyde therewith.

2. The method of hot-molding phenol resin compositions of the potentially reactive type which are deficient in plasticity, comprising incorporating furfuraldehyde therewith in proportions not exceeding 15% by weight of the composition.

3. The method of preparing a plasticized molding mixture, comprising comminuting a potentially reactive paper-phenol resin product and incorporating furfuraldehyde therewith.

4. The hereindescribed molding mixture comprising a phenol-resin molding composition of the potentially reactive type, having incorporated therewith free or uncombined furfuraldehyde in proportions not exceeding 15% by weight of the composition.

In testimony whereof, I affix my signature.

FRANK P. BROCK.